Sept. 8, 1959

R. C. SABINS 2,903,405

CORROSION PREVENTION SYSTEM

Filed May 24, 1956

FIG. 1

INVENTOR.
ROLLAND C. SABINS

BY

J. F. McLellan

ATTORNEY

United States Patent Office 2,903,405
Patented Sept. 8, 1959

2,903,405
CORROSION PREVENTION SYSTEM

Rolland C. Sabins, San Diego, Calif., assignor, by direct and mesne assignments, to Sabins Dohrmann, Inc., San Francisco, Calif., a corporation of California Application May 24, 1956, Serial No. 586,969

6 Claims. (Cl. 204—197)

The present invention relates to corrosion prevention systems and more particularly to that type of system which acts to prevent corrosion or galvanic dissolution by cathodic protection.

Several methods and systems have been proposed and used to reduce or prevent the characteristic galvanic corrosion which occurs on most metals whenever dissimilar metals are electrically connected together and submerged or immersed in an electrolyte, such as earth or sea water or the like. The most effective of these systems have been those utilizing cathodic protection principles.

Cathodic protection systems are based upon the well known phenomena of dissimilar metal corrosion, which is characterized by some form of interaction of the metallic ions generated by the galvanic association of an electrolytic solution, a corroding or anodic metal, and a relatively non-corroding or cathodic metal. This interaction appears to be generated by a flow of current passing through the electrical conductor connecting the metals, and is exhibited by the passage of metallic ions into solution at the anode and the discharge of metallic ions at the cathode, the total quantity of current or charge passing out at the anode being substantially equal to that passing in to the cathode. Stated another way, the anodic metal, being higher in the electrochemical series as compared with the cathodic metal, has a higher potential which creates a flow of current through the electrical conductor joining the metals. This flow in turn creates a deficiency of electrons on the external surfaces of the anode and a consequent positive polarization, expressed as dissolution potential or corrosion potential, that potential at which the electrode will be dissolved, consumed or physically lost into solution. The flow of current also creates a negative polarization and opposite electrochemical reaction at the cathode by reason of the excess of electrons on the external surfaces of the cathode. These negative and positive ploarizations attract ions of opposite sign from the electrolyte and form various corrosion products at the anode and cathode, depending upon the chemical make-up of the electrolyte and the anode and cathode. Thus, for example, steel and magnesium electrodes in sea water will function to form various calcareous deposits at the steel cathode while at the magnesium anode there will be a release of hydrogen gas. Hydrogen will also form on the surface of the cathode when the potential or impressed voltage is sufficiently high, stripping off any paint which may be present in that area.

The cathodic protection systems act to prevent galvanic corrosion or dissolution of dissimilar metals by supplying external current to the corroding or anodic metal in an amount sufficient to negatively polarize the metals, that is, negatively impress electrons or polarize the metals above the dissolution potential of each to a point where they cease to ionize into solution, or dissolution, with the termination of dissolution there will be no metal or physical losses, or, stated another way, there will be no corrosion or dissolution. In this regard, it is noted that use of the phrase "dissimilar metals" herein is intended to also include those situations wherein only a single metal is involved, but where the peculiarities of its environment or its composition produce anode-cathode relationships. For example, the impurities and millscale in a sheet of steel produce many cathodic areas, known as local cathodes, and corrosion occurs in the remaining local anode areas, the many galvanic couples thus formed resulting in dissolution or galvanic pitting in that area of the steel. Like the anode and cathode relationship of two dissimilar metals such as copper and steel, the local anodes-local cathodes relationship just described is also protectable by the application of an external and elevating current. It is also noted that the term "corrosion" is used herein to generally denote all galvanic losses associated with a galvanic couple, such as galvanic dissolution and galvanic pitting.

The prior art cathodic protection systems have evolved into two separate and distinct categories, the sacrificial anode systems and the impressed current systems, each with its peculiar shortcomings and disadvantages, as will be seen.

The sacrificial anode systems function to supply the protecting or elevating external current by using an anode or metal higher in the electrochemical series as compared with the metal to be protected. Such an anode will have a higher potential, that is, a greater tendency to pass from the atomic to the ionic state, and will by reason of this greater ionic activity generate a flow of current through an external conductor connecting the dissimilar metals and prevent, for example, local current from flowing between the local anodes and local cathodes of a steel plate. Although the current flowing in the external conductor should be just sufficient to prevent galvanic activity at the local anodes and cathodes, the sacrificial anode systems of the prior art have had to maintain much higher potentials, particularly in the cathodic protection of large areas, because to maintain a protecting potential at distant areas near areas have had to be over protected. Thus, for example, in the cathodic protection of ship hulls by magnesium anodes, areas adjacent the anode have had a concentrated or over protection which commonly strips off protective paint coatings from the hull and undesirably deposits heavy coatings of calcalerous matter. Further, the maximum current output is determined by the surface area of the anode and by the inherent resistances in the system, such as the resistances of the lead connections, and in order to provide cathodic protection over an extended period of time the consumable anodes must be large enough to provide adequate electron flow or current flow up until their normal time of replacement with new anodes. This disadvantage has been offset to a certain extent by inserting a fairly large resistance in the electrical circuit connecting the electrodes, and over a period of time reducing this resistance as required; however a lack of flexibility of current adjustment is nevertheless present. The cost of replacing anodes can be fairly expensive, both from a material and a labor standpoint, and thus their frequent replacement is undesirable.

The impressed current systems of the prior art provide cathodic protection, not by the use of sacrificial metals high in the electrochemical series, but by the use of a substance or metal low in the electrochemical series as an anode and impressing a direct current to the structure to be protected to provide the necessary protective current. A comparatively inert metal is used as the anode so that it will not take part in the galvanic process, as would a more active metal, and in this way the life of the anode may be greatly extended. However, as was the case with the sacrificial anode systems of the prior art, the current input to the cathode or protected metal must be high enough to protect areas remote from the anode, and this results in undesirable coatings of calcareous material on the cathode in the region near the anode. Also, on ships' hulls for example, the high current input causes the paint to be quite badly stripped away in the anode vicinity. This excessive and concentrated protection in the anode area is particularly bad in the presently known impressed current systems because the area of the anode is generally not great, as where the anode is made of platinum, and in order to achiece the proper level of current density a fairly high voltage must be applied in the circuit to overcome the anode-to-sea resistance. This resistance, in the case of a ship in fresh water, for example, is quite high for the small anode area available. Further, the relatively inert nature of the anode requires that a considerable voltage be applied in the circuit before the voltage can even overcome the difference in potential between the anode and the metal to be protected. It will be apparent that all of these factors dictate the use of high impressed voltages, and in practice the voltages have proved to be much higher in the cathode areas immediately adjacent the anode than presently known paint films can withstand. Not only is the paint in these areas undesirably stripped away, increasing the amount of cathodic protection which must be provided, but also it will be apparent that a great deal of powder is wasted in over protecting near areas of the cathode to achieve adequate protection of the more remote cathode areas. Further, an inadvertent power failure will completely end further cathodic protection until power is again obtained, and the former cathodic areas will become undesirably anodic with respect to the former anode or anodes.

Accordingly, the cathodic protection system of the present invention substantially prevents corrosion of the metal to be protected, and achieves such protection without the deposition on the metal of undesirably thick layers of calcareous deposits or corrosion products, and without the undesirable stripping from the metal of paint or other protective films. The system of the present invention is characterized by simplicity of operation and ease of installation, and includes an impressed current portion which lends flexibility of operation to the system by reason of the adjustability of the amount of applied voltage. This impressed current portion utilizes a comparatively small and inert anodic material having extended service life, but the small area of the anode is compensated for by the provision of a larger array of sacrificial anodic material coupled to the impressed current section of the system. This unique combination provides uniform current distribution over the complete area to be protected, eliminating areas of extreme over concentration or over protection. Further, in the event of a failure of power, the array of sacrificial material provides corrosion protection although the impressed current section of the system is completely inoperative. The service life of the anodic sacrificial material is very greatly extended by reason of the function of the impressed current portion of the present system, as will be described, so that replacement of the anodes is an infrequent task. The improved distribution of current afforded by the larger array of sacrificial metal reduces the power requirement which would otherwise be necessary in the usual impressed current systems of the prior art, and as stated, the elimination of over protection and stripped paint areas is of great significance in the corrosion protection of metallic structures, and particularly ships' hulls in sea water. The present invention is particularly well suited to this latter application, and the description hereinafter will be primarily directed thereto although it is to be understood of course that such application is merely illustrative of the merits of the present invention and no limitation thereto is intended.

It is therefore an object of the present invention to provide an improved corrosion prevention system which provides more uniform distribution of current over the area to be protected.

Another object of the invention is to provide a novel cathodic protection system wherein there is substantially no appreciable deposition of calcareous matter or corrosion products on the area to be protected.

It is another object of the invention to provide a unique cathodic protection system exhibiting certain of the attributes of both sacrificial anode systems and impressed current systems, and characterized by an ability to function as a sacrificial anode system in the event of a power failure to the overall system.

An additional object of the invention resides in the provision of an improved cathodic protection system adapted to prevent corrosion of a painted metallic surface and characterized by substantially no tendency to strip away the paint from such surface.

A still further object of the invention is the provision of a novel combination of sacrificial anode systems and impressed current systems which permits of adjustment of the level of impressed current applied to the system.

Another object of the invention is to provide a novel cathodic protection system which is comparatively simple in operation, easy to maintain, and which is characterized by extended service life of the anodic materials.

Other objects and features of the present invention will be readily apparent to those skilled in the art from the following specification and appended drawings wherein is illustrated a preferred form of the invention, and in which:

Figure 1 is a diagrammatic representation of the components and circuitry of the cathodic protection system of the present invention with the polarities indicated.

The description hereinafter made will be directed to an embodiment of the system of the present invention which is particularly adapted for use in the cathodic protection of the steel hull of a ship in sea water. It is to be understood of course that any reference to a ship's hull is merely illustrative and not intended to limit the scope of the present invention whatsoever.

Referring to the drawings, there is illustrated a cathodic protection system, generally designated 11, which comprises a metallic surface or cathode 12 to be protected, a sacrificial or bipolar electrode 13, and an anode 14. A dash-dot line 15 is illustrative of the level of the electroylte material, as for example sea water, in which components 12, 13, 14 are immersed or submerged.

An external electrical conductor or circuit 16 connects sacrificial material 13 to cathode 12, and in this circuit is a resistance 17, preferably a variable resistance, and an ammeter 18 or other device for measuring the amount of current flowing in circuit 16.

Similarly, an external electrical circuit 19 connects anode 14 to sacrificial electrode 13, and in this circuit is a current control means such as a resistance 21, preferably a variable type, and an ammeter 22 for measuring the current flow in circuit 19. In addition, a current source 23 is located in circuit 19 for providing impressed current for the present system 11, as will be seen. It is noted that current control means 21 may also take other forms, such as a conventional field control in the event that current source 23 is a dynamotor, or current control means 21 may be a variable transformer if a rectifier is used in circuit 19. Ammeters 18 and 22 are used in the circuits for various practical reasons, as for example to make an analytical check on the functioning of the system and the rate of flow of current under varying conditions.

Cathode 12 is adapted for electrical connection by a circuit 24 to a standard reference or reference electrode 25 through a sensitive millivoltmeter 26, and, likewise, sacrificial electrode 13 is adapted for electrical connection by a circuit 27 to the same reference electrode 25 through the same millivoltmeter 26. For clarity and simplicity both circuits 24 and 27 are illustrated as connected to reference electrode 25 although in actual practice a switching system (not shown) is used whereby either circuit 24 or 27 may utilize the reference electrode 25 and millivoltmeter 26, as desired.

Although cathode 12 may be a metallic surface which it is desired to be protected against corrosion, it will be assumed for the purposes of the present description that cathode 12 represents a ship's steel hull in sea water, and that the reference electrode 25 is a silver-silver chloride electrode located relatively distant from sacrificial material 13 and anode 14 so that its indications will not be affected by any action which may take place at those points. In addition, material 13 will be assumed to be an alloy magnesium, presently the most effective material used in sacrificial systems of the prior art, and anode 14 will be assumed to be relatively smaller in surface area and made of platinum, a relatively inert metal low in the electrochemical series. Using these components in system 11 in actual tests, it has been found that with respect to the reference electrode 25 the steel cathode 12 has a potential of 630 millivolts, and this potential will be indicated by millivoltmeter 26 in reference circuit 24; and that the magnesium alloy 13 has a potential of 1590 millivolts, as indicated in circuit 27; and that the platinum anode 14 has a reverse polarity or minus potential of 850 millivolts, as determined by a circuit arrangement (not shown) similar to reference circuits 24 and 27.

It is known that to protect a ship's hull made of steel from corrosion in sea water a potential must exist of approximately 890 millivolts, depending upon various factors such as the mass of the ship, between the hull and the reference electrode, and accordingly the potential of steel cathode 12 must be raised 260 millivolts to prevent galvanic corrosion or dissolution of metal resulting in pitting. Similarly, magnesium 13 will be protected from passing into solution if its potential is raised to 2105 millivolts and, accordingly, the potential of magnesium alloy 13 must be raised 515 millivolts to prevent dissolution thereof. Platinum anode 14 is relatively inert and its dissolution potential is for all practical purposes ignored.

In the operation of the system 11 of the present invention, the potential of cathode 12 and magnesium 13 is raised by current source 23, which drives current through circuit 19 to magnesium 13, and through circuit 16 to cathode 12, the amount of current being read, respectively, at ammeters 22 and 18. Further, the current flowing in circuits 16 and 19 is preferably adjusted, as by regulating the amount of the resistance 17 and 21, respectively, to prevent an excessive and wasteful flow of current. The accompanying galvanic action produces a release of chlorine at anode 14, a release of principally hydrogen gas and sodium hydroxide at magnesium 13, while at cathode 12 there occurs no perceptible deposition or release of any material or gas, as demonstrated by actual tests. In addition, none of the elements 12, 13, or 14 are corroded or eaten away during the above operation. Thus, it can be seen that no appreciable calcareous deposition takes place at the steel cathode 12, and the life of the materials of elements 12, 13, and 14 is indefinite so long as current source 23 continues to function. In the event that source 23 fails, it will be apparent that magnesium 13 is prepared to provide protective current through circuit 16 to cathode 12.

It is noted also that although the potential through circuit 19 is quite high, actual measurements indicating it to be approximately 4100 millivolts during the above-described operation, this high potential is not concentrated at adjacent areas of the steel cathode 12, but instead is apparently assumed mainly by magnesium 13, and the greater surface area of magnesium 13 then permits a more uniform distribution of current to cathode 12. In this manner, high potentials at cathode 12, and consequent paint stripping, are substantially prevented. This feature is particularly important where the electrolyte is fresh water since a fairly high potential must be developed at the anode to permit the fresh water path resistance to be overcome. It will also be apparent that the level of impressed current in circuit 19 may be adjusted by operation of the current control means 21, whereby a considerable flexiblity is imparted to the system to accommodate varying current requirements at cathode 12, as would be produced, for example, by a change in the ship's draft.

From the description hereinabove made, it will be apparent that cathode 12 may be any metal which it is desired should be protected against corrosion, that anode 14 is preferably a material low in the electrochemical series or useful as an anode in impressed current systems, and also that material 13 is preferably a material higher than cathode 12 in the electrochemical series or useful as an anode in sacrificial anode systems.

While a preferred embodiment of the invention has been specifically disclosed, it is understood that the invention is not limited thereto as many variations will be readily apparent to those skilled in the art and the invention is to be given its broadest possible interpretation within the terms of the following claims:

I claim:

1. In an electrolytic system of the type which includes an electrolyte, an electrode adapted to be immersed in the electrolyte, a cathode and an anode adapted to be immersed in the electrolyte, said first named electrode being formed of a material higher in the electrochemical series than the cathode, means including a source of D.-C. current connected between the anode and said first named electrode to impress a current flow between the same to thereby maintain the polarization level of the first named electrode at a predetermined level to prevent dissolution of the first named electrode, and means connecting said first named electrode to said cathode to permit current flow between the first named electrode and the cathode at a predetermined polarization level to prevent dissolution of the cathode, the polarization level on the first named electrode being higher than that on the cathode.

2. An electrolytic system as in claim 1 wherein the first named electrode is formed of a material which will go into solution when the polarization level on the first named electrode is below a predetermined value, and wherein the predetermined level of polarization normally maintained on said first named electrode is sufficient to prevent dissolution of the first named electrode, the first named electrode serving to maintain the polarization level on said cathode in the event of cessation of the impressed current flow between the anode and the first named electrode.

3. An electrolytic system as in claim 1 wherein the anode is formed of a relatively inert material.

4. An electrolytic system as in claim 1 wherein the means connected between the anode and the first named electrode includes adjustable resistance means and the means connected between the first named electrode and the cathode also includes adjustable resistance means.

5. In an electrolytic system of a type which includes an electrolyte, a cathode and an anode adapted to be immersed in the electrolyte, a bipolar electrode adapted to be immersed in the electrolyte, means including a source of D.-C. current connected between the anode and said bipolar electrode to impress a current flow between the same, said means including an adjustable resistance whereby the polarization level on the electrode may be maintained at a predetermined level, and means connecting said bipolar electrode to said cathode to permit current flow between the bipolar electrode and the cathode, said last named means including an adjustable resistance whereby the cathode may be maintained at a predetermined polarization level.

6. An electrolytic system as in claim 5 wherein said bipolar electrode is formed of a material which will go into solution into the electrolyte, and wherein the predetermined level at which the bipolar electrode is maintained is sufficient to prevent dissolution of the bipolar electrode.

References Cited in the file of this patent

UNITED STATES PATENTS

| | | |
|---|---|---|
| 499,726 | Fletcher | June 20, 1893 |
| 1,055,327 | Hering | Mar. 11, 1913 |
| 1,465,034 | Antisell | Aug. 14, 1923 |
| 2,402,494 | Hantzsch et al. | June 18, 1946 |
| 2,491,225 | Stearns | Dec. 13, 1949 |
| 2,700,649 | Hosford | Jan. 25, 1955 |
| 2,744,863 | Andrus | May 8, 1956 |

FOREIGN PATENTS

| | | |
|---|---|---|
| 24,967 | Great Britain | Dec. 14, 1899 |
| 26,995 | Denmark | Dec. 6, 1920 |
| 974,074 | France | Sept. 27, 1950 |
| 1,112,228 | France | Nov. 9, 1955 |

OTHER REFERENCES

"Fortune," February 1949, page 182.

UNITED STATES PATENT OFFICE
CERTIFICATE OF CORRECTION

Patent No. 2,903,405                                                               September 8, 1959

Rolland C. Sabins

It is hereby certified that error appears in the printed specification of the above numbered patent requiring correction and that the said Letters Patent should read as corrected below.

Column 1, line 51, for "ploarizations" read -- polarizations --; column 2, line 44, for "calcalerous" read -- calcareous --; column 3, line 25, for "powder" read -- power --.

Signed and sealed this 5th day of April 1960.

(SEAL)
Attest:

KARL H. AXLINE                                                    ROBERT C. WATSON
Attesting Officer                                              Commissioner of Patents